3,266,916
TECHNICAL GLASS

Heinz Brömer, Hermannstein, and Norbert Meinert, Wetzlar (Lahn), Germany, assignors to Ernst Leitz, G.m.b.H., Wetzlar (Lahn), Germany
No Drawing. Filed Aug. 22, 1962, Ser. No. 218,560
Claims priority, application Germany, Sept. 1, 1961, L 39,921
4 Claims. (Cl. 106—54)

In the machine tool industry, use is being made to an ever increasing extent of the installation of optical observation arrangements in order to be able to meet adequately the increasing demand for precision in the work piece being made. In this connection, glass scales from a background of the illuminating technology and projection technology have special advantages for observation installations as compared with the heretofore universally used metal scales. Certainly, on the other hand, there exists the difficulty that glass normally possesses a different coefficient of expansion from that of the metals used in the construction of the operating machine especially of iron and its alloys.

The technical glasses of the present invention obviate this disadvantage in that their coefficients of expansion are specially fitted to that of iron and its alloys. Obviously, these glasses can be used not only for scales for machine tools, comparators and the like but also for seals for electric current leads, for example, for discharge tubes, notwithstanding that they possess a relatively high softening point. A further especial advantage of the new glasses is their extraordinary high chemical resistance. The technical glasses are melted down from mixes based on a silico-borate foundation, silica foundation and contain proportionately large amounts of titanium oxide and alkali oxide. A variation of the coefficient of expansion can be attained by smaller amounts of alkaline earth oxides, especially barium oxide, as well as by oxide of zinc and/or zirconium.

In particular, the mixes comprise the following constituents:

|  | Percent by weight |
|---|---|
| $SiO_2$ | 20–30 |
| $B_2O_3$ | 5–16 |
| Alkali oxide | 25–30 |
| $TiO_2$ | 20–35 |
| Alkaline earth oxides | 0–10 |
| ZnO | 0–15 |
| $ZrO_2$ | 0–10 |

Of the alkali oxides at least one oxide of the elements sodium, potassium, rubidium and/or caesium will be employed, preferably the oxide of sodium and/or potassium. Of the alkaline earth oxides, the oxides of magnesium, calcium, strontium and/or barium are employed, for which barium oxide is especially suitable.

In the table are given some examples for mix compositions, which, however, are not to limit the extent of the invention. Next to the compositions of the melts the linear coefficient of the thermal expansion is designated. The thermal coefficient of expansion is measured with the Leitz dilatometer between room temperature and about 55° C. The coefficients of expansion of the melts which are designated with an asterisk (*), are measured interferometrically at intervals from 22–32° C.

Moreover, the chemical resistance of the glasses is given which was determined according to the method of H. Bredow published in "Glas-Email-Keramo-Technik," vol. 10 (1959), issue 8, pages 297–299. From the table it is to be observed that the coefficient of expansion can be controlled between 10 and $14.3 \times 10^{-6}$/per degree C.

TABLE
[In percent by weight]

| Melt No. | MS/Br38 | MS/Br57 | MS/Br36 | MS/Br41 | MS/Br45 | MS/Br51 |
|---|---|---|---|---|---|---|
| $SiO_2$ | 20.0 | 25.0 | 20.0 | 20.0 | 25.0 | 20.0 |
| $B_2O_3$ | 10.0 | 10.0 | 10.0 | 10.0 | 10.0 | 10.0 |
| $Na_2O$ |  | 35.0 |  |  |  | 27.5 |
| $K_2O$ | 35.0 |  | 35.0 | 35.0 | 35.0 |  |
| $TiO_2$ | 25.0 | 30.0 | 35.0 | 25.0 | 30.0 | 25.0 |
| CaO |  |  |  | 10.0 |  |  |
| BaO |  |  |  |  |  |  |
| ZnO | 10.0 |  |  |  |  | 12.5 |
| $ZrO_2$ |  |  |  |  |  | 5.0 |
| $\times 10^{-6}$ | 14.3 | 13.5 | 13.3 | 13.3 | 12.9 | 12.1 |
| n/10 $HNO_3$ | 159 | 95 | 47 | 147 | 83 | 108 |
| St. Acet | 188 | 128 | 62 | 168 | 72 | 81 |

| Melt No. | MS/Brb* | MS/Br54 | MS/Br58 | MS/Br60 | MS/Bra* | MS/Br55 | MS/Br31 | MS/Br59 |
|---|---|---|---|---|---|---|---|---|
| $SiO_2$ | 22.5 | 20.0 | 25.0 | 20.0 | 22.5 | 20.0 | 21.0 | 25.0 |
| $B_2O_3$ | 10.0 | 10.0 | 10.0 | 10.0 | 10.0 | 10.0 | 15.8 | 5.0 |
| $Na_2O$ |  |  | 30.0 | 25.0 |  |  | 26.4 | 27.5 |
| $K_2O$ | 35.0 | 30.0 |  |  | 30.0 | 25.0 |  |  |
| $TiO_2$ | 32.5 | 35.0 | 30.0 | 35.0 | 32.5 | 35.0 | 21.0 | 25.0 |
| CaO |  |  |  |  |  |  |  |  |
| BaO |  | 5.0 |  | 10.0 | 5.0 | 10.0 |  |  |
| ZnO |  |  |  |  |  |  | 10.5 | 12.5 |
| $ZrO_2$ |  |  | 5.0 |  |  |  | 5.3 | 5.0 |
| $\times 10^{-6}$ | 11.7 | 11.5 | 11.4 | 11.1 | 10.9 | 10.3 | 10.3 | 10.0 |
| n/10 $HNO_3$ |  | 36 | 37 | 18 |  | .7 | 110 | 21 |
| St. Acet |  | 46 | 33 | 13 |  | 21 | 110 | 43 |

The in part extraordinary chemical stability of the technical glasses proves very important especially for its application as a scale.

As an example of the melting and processing of the melt, the melt No. MS/Brb* is as follows, the melt consisting of:

| | Percent by weight |
|---|---|
| $SiO_2$ | 22.5 |
| $B_2O_3$ | 10.0 |
| $K_2O$ | 35.0 |
| $TiO_2$ | 32.5 |

The boron trioxide is introduced into the mix as $H_3BO_3$, the potassium oxide as potassium carbonate $K_2CO_3$. To the raw weight of 2.5 kg. (calculated as oxide), is added 0.05 gr. of $TeO_2$ and mixed well therethrough. Then the melt mixture is placed in a platinum crucible heated to 1200° C. The mix is melted after about 60 minutes. Then the temperature is raised to 1300–1350° C. and stirred for at least 15 minutes. Finally, the temperature is lowered to 1100–1150° C. while stirring and held at this temperature for 30 minutes. Thereafter, the temperature is brought to 900° C. with constant stirring and finally cast in warmed steel molds.

The preferred glass for any purpose is the glass with a coefficient of thermal expansion approximating most closely the metal with which it is to be combined.

Having described our invention we claim:

1. Technical glass with a linear coefficient of thermal expansion between $10 \times 10^{-6}$ and $14.5 \times 10^{-6}$ per degree C. molten from a mixture consisting essentially of

| | Percent by weight |
|---|---|
| $SiO_2$ | 20–30 |
| $B_2O_3$ | 5–16 |
| Alkali oxides | 25–35 |
| $TiO_2$ | 20–35 |
| Alkaline earth oxides | 0–10 |
| ZnO | 0–15 |
| $ZrO_2$ | 0–10 |

2. Technical glass according to claim 1 having a linear coefficient of thermal expansion of $11.7 \times 10^{-6}$ per degree C. molten from a mixture consisting of

| | Percent by weight |
|---|---|
| $SiO_2$ | 22.5 |
| $B_2O_3$ | 10.0 |
| $K_2O$ | 35.0 |
| $TiO_2$ | 32.5 |

3. Technical glass according to claim 1 characterized in that the mixture contains at least one oxide of the elements, sodium, potassium, rubidium and caesium.

4. Technical glass according to claim 1 characterized in that the mixture contains at least one oxide of the group of elements consisting of magnesium, calcium, strontium, and barium.

References Cited by the Examiner

UNITED STATES PATENTS

| 3,017,279 | 1/1962 | Van Dolah et al. | 106—48 |
| 3,095,321 | 6/1963 | Breedlove | 106—48 |

TOBIAS E. LEVOW, *Primary Examiner.*

H. M. McCARTHY, *Assistant Examiner.*